United States Patent [19]
Ohira

[11] Patent Number: 5,672,013
[45] Date of Patent: Sep. 30, 1997

[54] HEAT-RESISTANT SLIDING BEARING

[75] Inventor: Koya Ohira, Kuwana, Japan

[73] Assignee: NTN Corporation, Osaka, Japan

[21] Appl. No.: 710,980

[22] Filed: Sep. 25, 1996

[30] Foreign Application Priority Data

Sep. 26, 1995 [JP] Japan ................................. 7-247635

[51] Int. Cl.$^6$ .................................................. F16C 33/20
[52] U.S. Cl. ...................... 384/297; 384/907.1; 384/909; 428/609
[58] Field of Search ................... 384/297, 907.1, 384/909; 428/609, 591

[56] References Cited

U.S. PATENT DOCUMENTS

| | | | |
|---|---|---|---|
| 4,547,434 | 10/1985 | Sumiyoshi et al. | 428/609 |
| 4,551,393 | 11/1985 | Sumiyoshi et al. | 428/609 |

*Primary Examiner*—Lenard A. Footland
*Attorney, Agent, or Firm*—Wenderoth, Lind & Ponack

[57] ABSTRACT

A sliding bearing which shows good sliding properties when it is brought into sliding contact with a soft mating member at high temperatures. The sling member is formed from a wear-resistant and heat-resistant resin composition made up of 100 parts by weight of a polyimide resin, and 5–25 parts by weight of scaly graphite.

3 Claims, 2 Drawing Sheets

HEAT-RESISTANT SLIDING BEARING

BACKGROUND OF THE INVENTION

This invention relates to a heat-resistant sliding bearing used particularly in a high-temperature environment such as in a heating/fixing device of an electronic photographic device.

Sliding bearings of synthetic resin are now used in broader fields of art than before. Such sliding bearings are required to have high heat resistance so that they can exhibit good friction/wear properties at elevated temperatures.

Some of mating members of these bearings are made of a lightweight and soft material such as aluminum alloy. Thus, it is also required to use bearings that will never damage even such soft mating members. Bearings that are required to exhibit these properties include slide bearings for heating/fixing units in copying machines and laser beam printers.

Copiers and laser beam printers for transferring data on original images to a recording medium or transfer material in the form of charged images are generally called electrophotographic devices.

FIG. 3 shows a heating/fixing unit for such a device. It has a heating roller 10 for heating and fixing toner images on a transfer material, and a press roller 11 which rotates and presses the transfer material against the heating roller 10.

The heating roller 10 is usually made of an aluminum alloy containing magnesium and is heated by a heater 12 to about 150°–230° C. The press roller 11 is made of iron and covered with e.g. silicone rubber. It is heated to about 70°–150° C. by heat transfer from the heating roller 10.

FIG. 4 shows a different heating/fixing unit. Instead of the metallic heating roller 10, it has an annular fixing film 15 made of a heat-resistant synthetic resin and having a release coating. A ceramic heater 16 is pressed against the press roller 11 through the fixing film 15 to improve heat transfer efficiency. The press roller 11 of this unit is heated to higher temperatures than the press roller 11 of the unit shown in FIG. 3.

The rollers, which are heated to high temperatures as described above, are supported at both ends by synthetic resin sliding bearings 13 and 14 (FIG. 3) or by sliding bearings (not shown in FIG. 4) for supporting the press roller 11. Conventional such bearings were made of polyphenylene sulfide (PPS for short) resin which is a thermoplastic synthetic resin having good heat resistance and mechanical strength. To make up for poor self-lubricity of such PPS resin, lubricants such as graphite, tetrafluoroethylene resin, lubricating oil, metallic oxides, aromatic polyamide resin, etc. are often added.

In order to increase copying or printing speeds, it is necessary to melt and fix toners as quickly as possible. For this purpose, it is preferable to heat the heating roller 10 to 250°–270° C. But the PPS resin, which has been used as a material for the bearings 13, 14, has a low melting point of 280° C. Thus, it is impossible to use such bearings at 250°–270° C.

To solve this problem, use of a polyimide resin has been proposed. That is, attempts are being made to use polyimide resin, a highly heat-resistant material, as sliding members under high-temperature, high-load, high-speed sliding conditions. For example, Unexamined Japanese Patent Publication 63-8455 proposes to add tetrafluoroethylene resin to a polyimide resin to improve sliding properties of the latter. Unexamined Japanese Patent Publication 63-314274 proposes to add hardened phenolic resin as well as tetrafluoroethyelene resin to a polyimide resin to improve wear resistance of the polyimide resin.

The compositions proposed in these publications exhibit good sliding properties if they are brought into sliding contact with relatively hard mating members at room temperature. But when brought into sliding contact with mating members made of a soft metal such as aluminum or an aluminum alloy at high temperatures, they tend to severely damage the mating members.

Also, adding carbon fiber to these compositions causes damage to the mating member of aluminum. When the mating members are damaged, friction/wear properties may worsen still.

An object of this invention is to provide a sliding bearing which shows good sliding properties when it is brought into sliding contact with a soft mating member at high temperatures.

SUMMARY OF THE INVENTION

According to the present invention, there is provided a heat-resistant sliding bearing formed from a heat-resistant, lubricative resin composition comprising 100 parts by weight of a polyimide resin, and 5–25 parts by weight of scaly graphite.

The heat-resistant sliding bearing according to the present invention, made of a polyimide as a main component and scaly graphite, is highly heat-resistant and exhibits good friction/wear properties, so that it will show good sliding properties when brought into sliding contact with a soft mating member.

The polyimide (PI for short) resin used in this invention is obtained by subjecting an aromatic carboxylic acid and an aromatic amine to condensation polymerization. It has excellent heat resistance, chemical resistance, mechanical properties and electric insulating properties. The PI resin used in this invention has imide bonds in its main chains. That is, PI resins having imide bonds and amide bonds in their main chains are not used in this invention.

A known PI resin such as P84-HT (LENZING in Austria), TI-3000 (made by Toray), UIP-S, R (made by Ube Kosan) may be used in this invention.

The scaly graphite used in this invention may be a natural or synthetic one. Its average particle diameter is not limited, but preferably 1–50 μm, more preferably 5–20 μm, and most preferably about 10 μm.

Specifically, such graphite may be ACP (Japan Kokuen: fixed carbon content 99.5%), KS-6 (LONZA: fixed carbon content 99.5%), or KS-10 (LONZA: fixed carbon content 99.5%).

By adding 5–25 parts by weight of scaly graphite to 100 parts by weight of PI resin, it is possible to improve the friction/wear resistance and reduce the size of articles formed from this composition. Also, such a composition will never damage a mating member even if it is made of a soft material such as aluminum alloy. If the addition rate of the scaly graphite is less than 5 parts by weight, wear resistance will not improve. If over 25 parts by weight, the molded article will be too brittle.

Besides the PI resin and the scaly graphite, various additives may be mixed into the composition according to this invention. For example, in order to improve the lubricating properties of the composition, a solid wear resistance improver may be added. Such wear resistance improvers include powder of carbon, mica, talc, wollastonite, or metallic oxide, molybdenum disulfide, boron nitride, phosphates, stearates, carbonates, whiskers of potassium titanate, titanium oxide, zinc oxide, aluminum borate, calcium carbonate, calcium sulfide, and molten fluororesins such as tetrafluoroethylene-perfluoroalkylvinylether copolymer (PFA), tetrafluoroethylene-hexafluoropropylene copolymer (FEP), tetrafluoroethylene-ethylene copolymer (ETFE), tetrafluoroethylene-hexafluoropropylene-perfluoro (propylvinylether) terpolymer (EPE).

These additives may be added to and mixed with the composition in any known way. Typically, the PI resin and the other materials are mixed together in such a mixer as a Henschel mixer, a ball mill or a tumbler mixer. The composition may be molded in any known way. For example, it may be molded by heating and compression, extruding with a ram, calcining in an inert gas or high-pressure atmosphere after compression molding at room temperature, or calcining after CIP molding.

The heat-resistant sliding bearing formed from the above composition is not limited in shape. Its shape may be determined according to the shapes of the heating and press rollers, peripheral devices and the housing. For example, instead of forming the bearing from a single material, it may be formed by two-color molding method as shown in FIG. 1. That is, the bearing shown in FIG. 1 has its bearing portion 1 and fixing metal portion 2 formed from different materials. Similarly, the heat-resistant bearing shown in FIG. 2 is formed by two-color molding method. That is, it comprises a bearing portion 3 and a resin portion 4 formed from a heat-resistant and heat-insulating resin such as PPS, polyamide-imide (PAI) or thermoplastic polyimide (PI) to which are optionally added inorganic or organic fillers.

Other features and objects of the present invention will become apparent from the following description made with reference to the accompanying drawings, in which:

DETAILED DESCRIPTION OF THE PREFERRED EMBODIMENT

EXAMPLE 1

Figure 1:
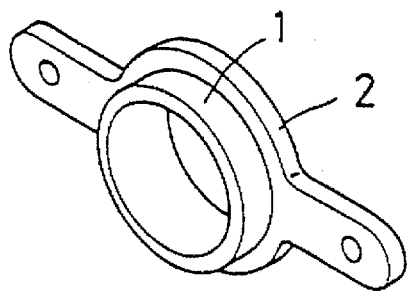
FIG. 1 is a perspective view of a heat-resistant sliding bearing of an embodiment of this invention.
Figure 2:
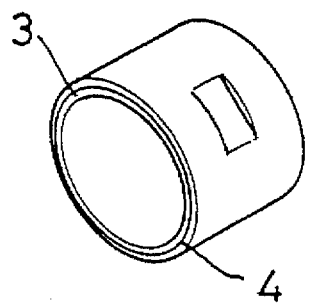
FIG. 2 is a perspective view of a heat-resistant sliding bearing of another embodiment of this invention.
Figure 3:
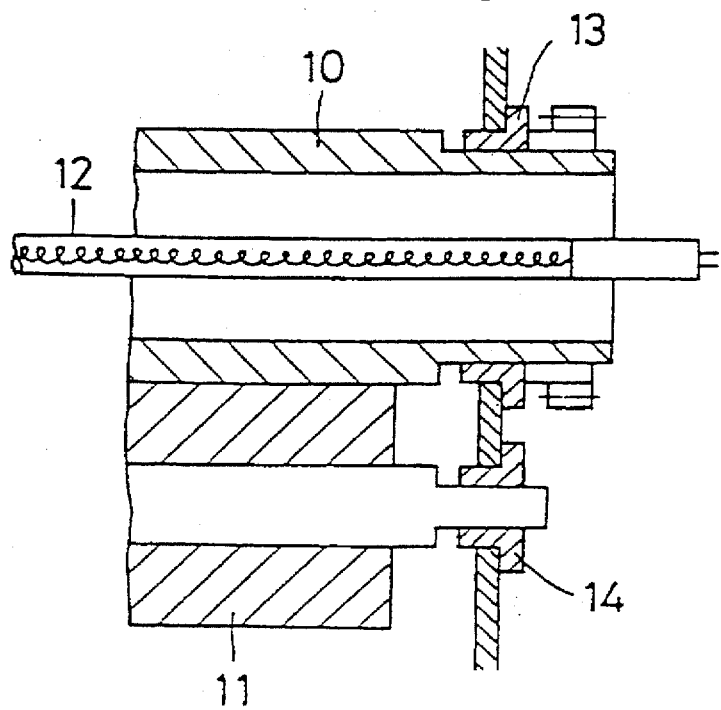
FIG. 3 is a sectional view of a heating/fixing unit, showing how bearings therein function.
Figure 4:
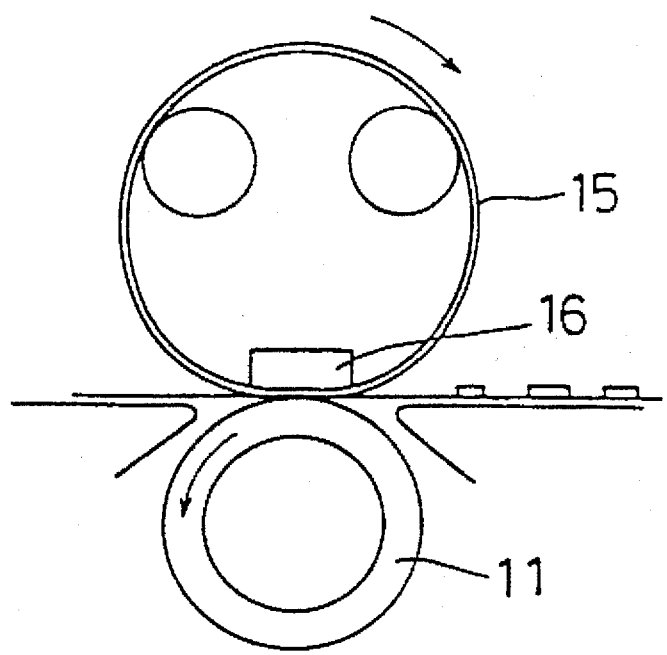
FIG. 4 is a sectional view of a different heating/fixing unit in which sliding bearings are used.

100 parts by weight of PI resin powder represented by Formula 1 (made by LENZAING: P84-HT, average particle diameter 25 μm) and 7 parts by weight of graphite (LONZA: KS-6, average particle diameter 6 μm) were sufficiently mixed together in a Henschel mixer. The mixture obtained was dried at 120° C. for 10 hours or over. About 50 grams of the thus dried resin mixture was put in a 30 mm diameter mold and molded into a column 30 mm in outer diameter and 50 mm high by heating it at 400° C. under the surface pressure of 1000 kgf/cm$^2$ for 60 minutes. The column obtained was formed into a ring-shaped test piece 28 mm in outer diameter, 20 mm in inner diameter and 5 mm wide. It was subjected to a high-temperature friction/wear test described below. The results of the test are shown in Table 1.

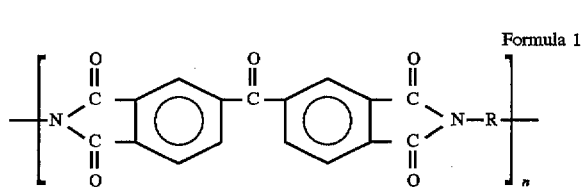

Formula 1

EXAMPLE 2

100 parts by weight of PI resin powder represented by Formula 2 (Ube Kosan: UIP-S, average particle diameter 10 μm) and 20 parts by weight of graphite (LONZA: KS-10, average particle diameter 10 μm) were sufficiently mixed together in a Henschel mixer. The mixture obtained was dried at 120° C. for 10 hours or over. About 52 grams of the thus dried resin mixture was put in a 30 mm diameter mold and molded into a column 30 mm in outer diameter and 50 mm high by heating it at 400° C. under the surface pressure of 1000 kgf/cm$^2$ for 60 minutes. The column obtained was formed into a ring-shaped test piece 28 mm in outer diameter, 20 mm in inner diameter and 5 mm wide. It was subjected to the high-temperature friction/wear test. The results of the test are shown in Table 1.

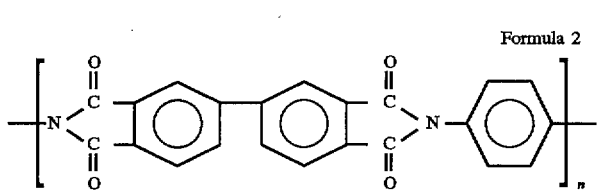

Formula 2

EXAMPLE 3

100 parts by weight of PI resin powder represented by Formula 3 (made by Toray: TI-3000, average particle diameter 5 μm, 20 parts by weight of graphite (LONZA: KS-6, average particle diameter 6 μm, and 7 parts by weight of PTFE (Mitsui Dupont: Teflon 7J, average particle diameter 20 μm were sufficiently mixed together in a Henschel mixer. The mixture obtained was dried at 120° C. for 10 hours or over. About 53 grams of the thus dried resin mixture was put in a 30 mm diameter mold and molded into a column 30 mm in outer diameter and 50 mm high by heating it at 400° C. under the surface pressure of 1000 kgf/cm$^2$ for 60 minutes. The column obtained was formed into a ring-shaped test piece 28 mm in outer diameter, 20 mm in inner diameter and 5 mm wide. It was subjected to the high-temperature friction/wear test. The results of the test are shown in Table 1.

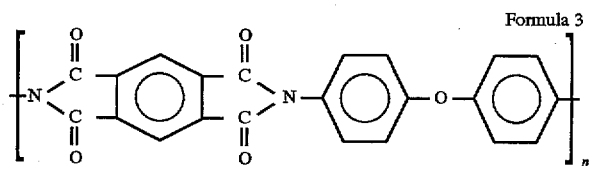

Formula 3

Example 4

100 parts by weight of PI resin powder represented by Formula 3 (Toray: TI-3000, average particle diameter 5 μm, 20 parts by weight of graphite (LONZA: KS-6, average particle diameter 6 μm), and 20 parts by weight of PTFE (Mitsui Dupont: Teflon 7J, average particle diameter 20 μm) were sufficiently mixed together in a Henschel mixer. The mixture obtained was dried at 120° C. for 10 hours or over. About 56 grams of the-thus dried resin mixture was put in a 30 mm diameter mold and molded into a column 30 mm in outer diameter and 50 mm high by heating it at 400° C. under the surface pressure of 1000 kgf/cm$^2$ for 60 minutes. The column obtained was formed into a ring-shaped test piece 28 mm in outer diameter, 20 mm in inner diameter and 5 mm wide. It was subjected to a high-temperature friction/wear test described below. The results of the test are shown in Table 1.

(High-Temperature Radial Friction/Wear Test)

The ring-shaped test pieces were each fitted on a mating member, that is, a rotary shaft made of aluminum alloy JIS A5052 (surface roughness 3.2S) and pressed against the outer periphery of the mating member under a load of 3.5 kgf/cm$^2$, while controlling the surface temperature of the rotary shaft at 250° C. A torque meter was mounted on the rotary shaft, and the rotary shaft was rotated continuously for 50 hours at a peripheral speed of 9.0 m/min. After the test, the wear (specific wear rate×10−10 cm$^3$/(kgf.m)) of each test piece and the torque (kgf.cm) of the rotary shaft were measured. Also, the degree of damage to the surface of the aluminum alloy mating member was observed. The degree of damage was evaluated in three stages, i.e. no damage (◯), slightly damaged (Δ), damaged (X). The results are shown in Table 1.

Comparative Examples 1-3

Test pieces were formed in the same way as in Example 1 except the contents of raw materials. They were subjected to the same high-temperature radial friction/wear test. Specific wear rate, torque of the rotary shaft and the degrees of damage were measured. The results are shown in Table 1. Comparative Example 3 was so low in strength when molded that it was impossible to mold a test piece.

As is apparent from the results shown in Table 1, wear rate was large in Comparative Examples 1 and 2. Torque was also large. They severely damaged the mating members.

In contrast, Examples 1–4 were low both in wear rate and rotating torque. Also, they never damaged the mating member of aluminum alloy (A50556).

The heat-resistant, lubricative resin composition according to this invention, comprising a PI resin and scaly graphite with a predetermined amount of tetrafluoroethylene resin optionally added, is low in friction and high in heat resistance, wear resistance and lubricity. It never attacks or damages a mating member of a soft alloy such as aluminum alloy. Such resin composition is suitable for use as a material for a sliding bearing used in a heating/fixing unit of an electronic photographic device.

TABLE 1

| | Polyimide (wt part) | Graphite (wt part) | Tetrafluoroethylene (wt part) | Amount of wear × 10$^{-10}$ cm$^3$/kgf. m | Torque kgf. cm | Damage to mating member |
|---|---|---|---|---|---|---|
| Example 1 | 100 | 7 | 0 | 300 | 0.25 | ◯ |
| Example 2 | 100 | 20 | 0 | 280 | 0.23 | ◯ |
| Example 3 | 100 | 20 | 7 | 265 | 0.22 | ◯ |
| Example 4 | 100 | 20 | 20 | 250 | 0.21 | ◯ |
| Comparative Example 1 | 100 | 0 | 0 | >1000 | 0.51 | X |
| Comparative Example 2 | 100 | 30 | | 800 | 0.41 | X |
| Comparative Example 3 | 100 | 15 | 30 | — | — | — |

What is claimed is:

1. A heat-resistant sliding bearing formed from a heat-resistant, lubricative resin comprising 100 parts by weight of a polyimide resin, and 5–25 parts by weight of scaly graphite.

2. A heat-resistant sliding bearing formed from a heat-resistant, lubricative resin comprising 100 parts by weight of a polyimide resin, 5–25 parts by weight of scaly graphite, and 5–25 parts by weight of tetrafluoroethylene resin.

3. A heat-resistant sliding bearing as claimed in claim 1 or 2 which is a sliding bearing for use in a heating/fixing unit.

* * * * *